May 25, 1971 J. F. SORENSON 3,579,686
AUTOMATIC SCREW MACHINE
Filed Oct. 7, 1968 2 Sheets-Sheet 1
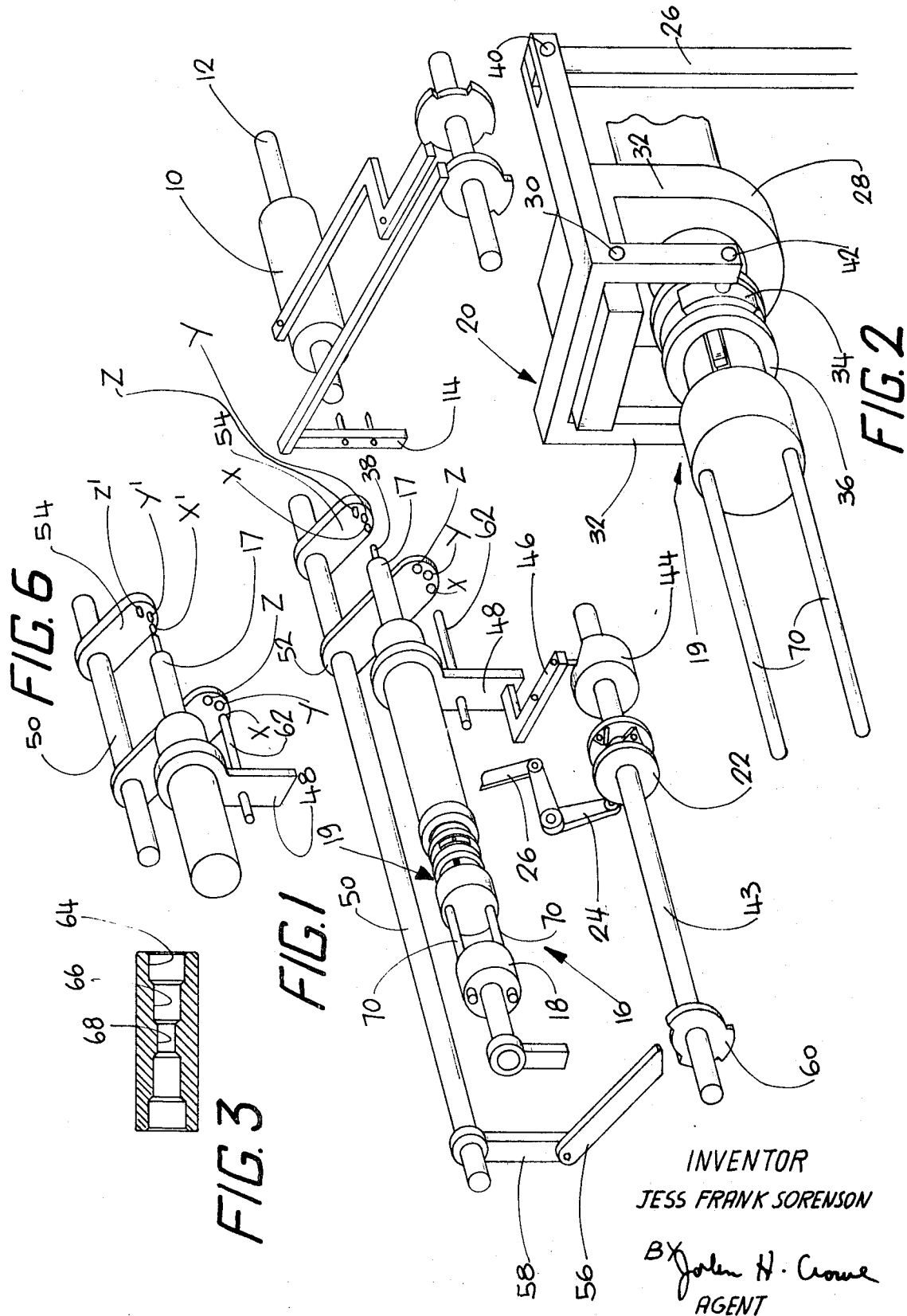
INVENTOR
JESS FRANK SORENSON
BY Jolen H. Crowe
AGENT

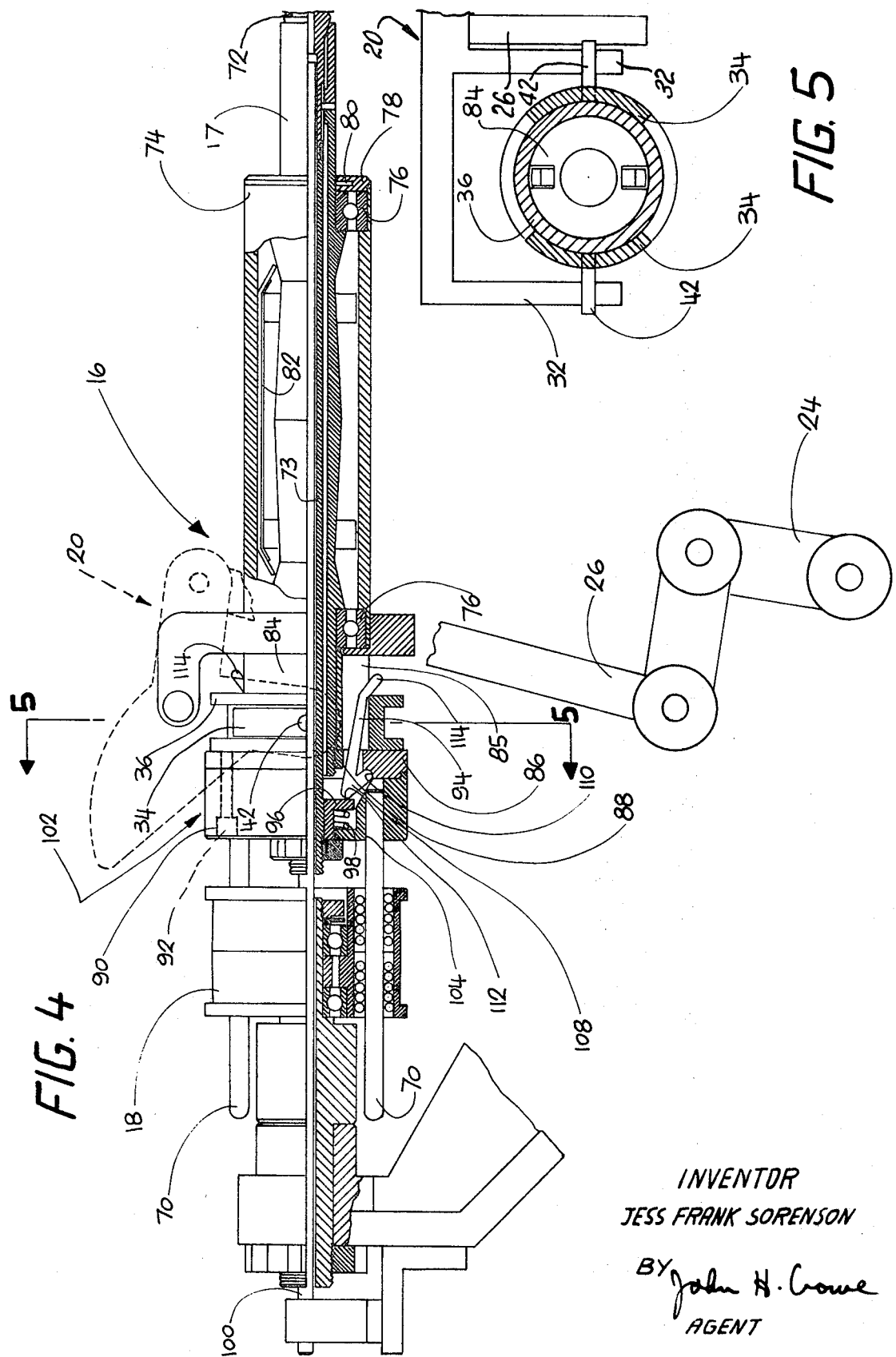

United States Patent Office 3,579,686
Patented May 25, 1971

---

3,579,686
AUTOMATIC SCREW MACHINE
Jess Frank Sorenson, Yucaipa, Calif., assignor to
Sorenson Engineering, Inc.
Filed Oct. 7, 1968, Ser. No. 765,391
Int. Cl. B23b 7/00, 13/00, 15/00; B23g 1/00, 11/00;
B22p 23/00
U.S. Cl. 10—87                    10 Claims

ABSTRACT OF THE DISCLOSURE

An automatic screw machine with a pulley-driven collet and spindle assembly for reciprocally moving parts into and out of contact with boring tools. The assembly has two rearwardly extending rods which fit slidably within receptive openings in a drive pulley to permit its axial reciprocation while being driven by the pulley. The assembly also has a pair of chucking levers mounted to pivot about one end, under the direction of a timing cam, and exert cam-like collet opening and closing pressures on a responsive member. The machine has an index rod and an index plate with receptive holes for the rod. The plate is affixed to a cam-controlled shaft to which a tool holder is also affixed. When the index rod is moved into one of the holes in the plate, a part held by the collet and spindle assembly is guided to a particular tool on the tool holder.

BACKGROUND OF THE INVENTION

This invention relates generally to an improved automatic screw machine of the type capable of machining the rear ends of parts continuously severed from bar stock during operation of the machine. More particularly, the invention relates to an auxiliary collet and spindle assembly for such a machine characterized by improvements in spindle driving, collet opening and closing and tool indexing features of unique advantage.

Automatic screw machines are well known in the art, and generally include a main spindle and head stock through which bar stock is intermittently advanced and recoiled to permit the performance of operations such as chamfering, undercutting, turning, centering, threading, knurling, boring, shoulder undercutting, etc., thereon. Machines of this type are generally provided with a tool frame to which tool slides having radially movable tool holders are attached. The tool holders are induced to move tools into and out of engagement with a work piece by rocker arms actuated by suitable timing cams. The radial movement of a tool into contact with the bar stock, or toward the center, is generally referred to as infeeding, the reverse motion being referred to as outfeeding. When such a machine is operating, bar stock is advanced intermittently axially out of the head stock to permit the continuous manufacture of identical parts in rapid succession therefrom. The terms "countersunk" and "counterbored" are employed synonymously herein, and intended to denote any end configuration of bar stock or a work piece characterized by one or more bores and/or conical surfaces in stepped relation around a common axis.

Earlier versions of the automatic screw machine were incapable of manufacturing parts having oppositely directed countersunk ends in a single continuous operation. A later version of the machine, described in U.S. Pat. 2,775,026 to Schrader (hereinafter called the Schrader machine), was designed to operate in such a way as to achieve this purpose. The Schrader machine has an auxiliary reciprocating driven collet and spindle assembly with a nonrotatable external housing and a protruding collet rotatively driven by a pulley operably connected to a hollow spindle housing a drawbar for the collet. This assembly is provided with an air-actuated collet control head which functions to open and close the collet in accordance with impulses timed for proper operation of the machine. The spindle and collet assembly is mounted for reciprocal movement toward and away from the head stock of the machine, and combined with timing and movement imparting cam means to effectuate its reciprocation in timed relation to the operations to be performed on the work. The Schrader machine has a single cam shaft provided with appropriately cut timing and movement imparting cams for controlling the reciprocating movements of the main spindle or head stock and the collet and spindle assembly as well as the movements of the tool holders during operation of the machine.

The Schrader machine functions by moving bar stock axially in the forward direction and reciprocating the bar stock into and out of contact with appropriate tools for counterboring the forward end of the bar stock, severing the partly worked forward portion of the bar stock and transferring the severed work piece to the auxiliary collet and spindle assembly while maintaining it in alignment with said bar stock, infeeding work tools and counterboring the reverse end of the work piece and, finally, releasing the work piece and outfeeding the work tools and work piece to move the latter out of the path of reciprocating travel of the auxiliary collet and spindle assembly, all as described in greater detail in the Schrader patent. The above-mentioned drive pulley for Schrader's auxiliary collet and spindle assembly is mounted on his spindle and receives its motive power by belt drive means.

Automatic screw machines of the Swiss type are high precision instruments in which the moving spindles, and other parts, must cooperate with the greatest of positional accuracy to avoid defective workmanship on the tiny parts being processed thereby. While the Schrader machine is capable of such high precision performance, it nevertheless has certain inherent characteristics disadvantageous to the high standard of precision required of such machines, chief among which is a side stress resulting from Schrader's method of driving his collet and spindle assembly. Thus, the driving belt connected to Schrader's spindle pulley exerts a side loading on the spindle which tends to cause cocking of the latter slightly out of alignment with the main spindle. While this misalignment might be minor, it is enough to cause potential trouble in a high precision operation such as that performed by a Swiss type automatic screw machine. Furthermore, since the collet and spindle assembly is designed to reciprocate longitudinally, the drive belt for its pulley must slip correspondingly along its drive pulley, and this creates additional side loading on the spindle to aggravate any condition of misalignment already existing as a result of the normal pull of the belt on the pulley.

In addition to the above-described possibility of misalignment in the Schrader machine, that machine has certain problem possibilities, especially in connection with its air-drive control head for the opening and closing of the collet in the auxiliary collet and spindle assembly. An air-drive system, by its nature, requires a complicated arrangement of parts, including tubes, microswitches, etc., each of which is a potential trouble area. Also, because of the necessity of distributing air pressure over a relatively large diaphragm in such a system, the control head must be of large size, which makes the equipment bulky and less easily manageable than would otherwise be the case. Moreover, air-drive systems are subject to leakage problems, especially after they have been in use for awhile. The necessity of an air compressor makes for additional problems of bulk and maintenance in air-drive systems and moisture in the air aggravates these problems by creating a need for filters, condensing in air lines, etc.

In addition to the foregoing areas of potential trouble in the Schrader machine, there is another such area in the tool positioning mechanism of the machine, in that it incorporates no means of assuring precise alignment of the work piece and tools during operation of the machine, or of locking the work piece against unwanted movement while it is in contact with such a tool. Schrader's auxiliary collet and spindle assembly is actuated by a separate timing cam from that actuating the tool holders cooperatively associated therewith, so that any slight misalignment of the collet and spindle assembly, as for example, from side thrust of a transmission belt on its drive pulley, with any of the separately mounted tools with which it is programmed to cooperate during particular phases of the machine operation is not self correcting. Even aside from the possibility of misalignment or cocking of the auxiliary collet and spindle assembly as a result of transmission belt pull on its pulley, there is always the danger of tool and work misalignment during any phase of Schrader's machine operation, as a result of uneven wear, deformation, etc., of the functioning parts of the spindle and collet assembly reciprocatnig mechanism, the tool holder infeeding and outfeeding mechanism, etc.

SUMMARY OF THE INVENTION

The improved automatic screw machine of this invention is designed to perform essentially the same function as the Schrader machine although, by virtue of built-in features not heretofore, to my known knowledge, in a somewhat different manner, and without the above-discussed shortcomings of the latter. To this end, my new machine has an auxiliary collet and spindle assembly somewhat similar to Schrader's counterpart assembly but differing from the latter in spindle drive and collet control means in such fashion as to avoid all of the above-noted weaknesses of Schrader's spindle drive and collet control means. Insofar as the problem of misalignment of the collet and spindle assembly, as a result of pulley belt side thrust is concerned, I have overcome this difficulty by mounting the pulley separately from the rest of the collet and spindle assembly, and connecting the latter in drive relationship with the former by means of two or more elongate driver rods firmly anchored to the rear of the movable part of the assembly and extending through mating openings in the pulley. The driver rods are mounted parallel to each other, and to the spindle axis, and spaced equal distances apart around, and equal distances away from, the spindle axis. The receptive openings for the driver rods in the pulley are disposed parallel to the pulley axis, and otherwise positioned to receive the rods and permit the transmission of rotative power to the spindle, through the rods, from the pulley. The rods are axially slidable within their mating openings in the pulley, whereby the collet and spindle assembly reciprocate during operation of the screw machine, while the pulley remains stationary. Preferably, the pulley openings have ball bushing inserts to permit sliding movement of the drive rods therein with a minimum of frictional resistance. It will thus be apparent that Schrader's problem of spindle misalignment from belt pull on his drive pulley is absent in my machine, since no thrust from the pulley belt is transmitted to the spindle of the auxiliary collet and spindle assembly of the latter, but only to a firmly mounted pulley which cannot transmit it to the spindle. Moreover, the stationary character of my drive pulley eliminates the belt sliding misalignment problem in Schrader's machine resulting from the above-described belt movement on his belt drive pulley. Thus, my new spindle drive means succeeds in overcoming, in one way or another, all of the parastic side thrust effects resulting from Schrader's spindle drive design.

A mechanical chucking control has been substituted in my machine for the air control system employed by Schrader for opening and closing the collet in the auxiliary collet and spindle assembly of his machine. The chucking mechanism functions simply and effectively with a minimum of working parts, later to be described in detail, for collet opening and closing purposes, in response to impulses from a timing and movement imparting cam, also subsequently to be described. Very simply, the mechanism includes two or more chucking levers positioned and supported in such fashion in a compact collet control head as to exert cam-like action on a flange mounted on the collet drawbar, and thereby cause the drawbar to move back and forth, relative to the spindle, as they are pivoted between extremes of position by the cam-induced movements of a chucking spool. By this means, I have succeeded in completely eliminating any need for an air control system of any sort in my auxiliary collet and spindle assembly, and thereby avoided all of the problems inherent in the use of such a system.

My new screw machine, in its preferred form, has an index system designed to guide a work piece into precisely aligned contact with a working tool, and hold it firmly in position during the machining operation, and thereby avoid any possibility of misalignment between the work piece and tool such as that inherent in Schrader's method of operating. The index system comprises a locking pin fixedly secured to a bracket mounted on the housing of the collet and spindle assembly, in a position offset from the assembly and parallel to its axis; an index plate with carefully positioned holes sized to snuggly receive the pin in sliding relationship; and a tool holder with a number of tools corresponding to the number of holes in the index plate affixed thereto in a pattern of distribution similar to the pattern of distribution of the holes in the index plate. The index plate and tool holder are fixedly secured to a shaft mounted parallel to the axis of the auxiliary collet and spindle assembly, and the shaft is connected, by means of a lever and connecting rod, to a timing cam on the same cam shaft on which the cam controlling the reciprocating motion of the collet and spindle assembly is mounted. All involved parts are oriented so that reciprocation of the collet and auxiliary spindle assembly in the direction of the head stock brings the locking pin into a predetermined one of the holes in the index plate and thereby guide a work piece held by the assembly into precisely aligned contact with an appropriate one of the tools on the tool holder and hold the work piece and tool in proper juxtaposition during the subsequent working operation. It will be evident from the foregoing that the indexing components of my new machine cooperate to guide, and hold, a work piece being shaped thereby to any of a variety of work tools required for the shaping, or machining, process.

It is thus a principal object of this invention to provide a means of rotating the spindle of a pulley driven auxiliary collet and spindle assembly in an automatic screw machine without risk of spindle misalignment, or cocking, as a result of belt loading on the pulley.

It is another object of the invention to provide a simple and compact means of opening and closing the collet of such an auxiliary collet and spindle assembly on timing cam cue, without any of the disadvantages of an air-controlled system for achieving this result.

It is still another object of the invention to provide a simple and effective means for guiding the work piece held by such an auxiliary collet and spindle assembly and any of a variety of working tools together, and holding them properly oriented during each operation performed on the work piece by the machine.

Other objects, features and advantages of the invention will become apparent in the light of subsequent disclosures herein.

BRIEF DESCRIPTION OF THE DRAWINGS

FIG. 1 is a diagrammatic representation, in perspective of the principal components of a preferred embodiment of an automatic screw machine in accordance with this invention.

FIG. 2 is an enlarged view also diagrammatic and in perspective, of part of a collet control mechanism forming an important part of the FIG. 1 machine.

FIG. 3 is an enlarged sectional view of a part with oppositely direct counterboard ends illustrative of the type of article formed from bar stock by said machine.

FIG. 4 is a longitudinal view, partly in section, of a driven and reciprocating collet and spindle assembly forming a part of the FIG. 1 machine.

FIG. 5 is a view, mostly in cross section of the collet and spindle assembly, taken along line 5—5 of FIG. 4.

FIG. 6 is a diagrammatic view, in perspective, of work piece indexing components of the FIG. 1 machine in indexing relationship.

DESCRIPTION OF THE PREFERRED EMBODIMENT

FIG. 1 more or less diagrammatically illustrates the principal parts of a preferred embodiment of an automatic screw machine in accordance with this invention having a head stock spindle 10, the housing of which includes suitable mechanism for collet opening and closing purposes and for rotation of the spindle at suitable speeds, such as, for example, speeds between 5,000 and 20,000 r.p.m. Bar stock being fed into the machine is illustrated at 12, and there is suitable mechanism, not shown, operatively associated with the head stock spindle for feeding the bar stock therethrough. The entire head stock is mounted for rectilinear motion to advance or recoil the bar stock as necessary during operation of the machine.

Spaced in front of the head stock is a tool frame carrying a plurality of radially arranged tool holders capable of radial movement with respect to the bar stock, under the influence of cams driven by the screw machine, one such tool holder being shown at 14. The tool holders carry tools specifically selected to carry out a program of operations on the bar stock.

In axial alignment with the head stock spindle is an auxiliary reciprocally driven collet and spindle assembly 16, the external housing of which is non-rotatable. Protruding from the forward end of this housing, in the direction of head stock spindle 10, is a spindle 17, in the outer end of which is a positioned collet, not visible in FIG. 1, holding a work piece 38 in the proper position for machining in accordance with this invention. The spindle 17 is driven by a pulley 18, in a manner hereinafter to be described. Opening and closing of the collet is accomplished by means of a collet control head 19 having, as a component, a movable chucking spool 36. The chucking spool is induced to move, for collet actuating purposes, by a chucking yoke 20, swivelly mounted on a bracket 28 by means of two pins 30 affixed to the upper ends of a pair of downwardly extending legs 32 thereof, in the manner illustrated in FIG. 2. The chucking yoke is pivotally secured, by means of a pin 40, to the upper end of an arm 26 connecting it to a lever 24 operatively associated with a trip dog holder cam 22 mounted on a cam shaft 43, all as shown in FIG. 1. The chucking spool 36 has an annular recess between two radial flanges around its periphery, and a pair of shoes 34, sized to fit snuggly between the flanges, are positioned in the recess, either side of the collet control head, by means of two pins 42 connecting the shoes with the lower ends of the downwardly extending legs 32 of chucking yoke 20 (only one of the shoes being visible in FIG. 2).

For reasons later made clear, chucking yoke lever 24 is moved back and forth between positional extremes by trip dog holder cam 22 in accordance with a prearranged timing schedule, as a result of which it imparts a swiveling movement to the chucking yoke, through arm 26, around pine 30. The swiveling yoke caused the shoes 34, and chucking spool 36 on which they ride, to move axially back and forth along the collet and spindle assembly 16, and thereby cause opening and closing of the collet in a manner hereinafter described.

The collet and spindle assembly 16 is mounted for reciprocating movement toward and away from head stock spindle 10 at the command of an appropriately cut timing and movement imparting cam 44, mounted on the cam shaft 43, and a spring return actuating level 46, operatively connected between the cam and a downwardly depending member 48 affixed to the collet and spindle assembly in the position illustrated in FIG. 1. It will, of course, be apparent that the cam 44 is designed to properly time the reciprocating movements of the collet and spindle assembly consistently with the operations to be performed on a work piece 38 held thereby. Spindle 17 is designed for rotation at the same, or higher, speed than the bar stock during operation of the machine.

Mounted on a shaft 50, disposed parallel to the axis of collet and spindle assembly 16, is an index plate 52 and a tool holder 54, the index plate and tool holder being affixed to the shaft so as to extend perpendicularly outwardly therefrom in appropriate position for a purpose hereinafter described. The shaft 50 is actuated to rotate between programmed positions in timed relation to the operations to be performed on work piece 38 by means of a timing and movement imparting cam 60 mounted on cam shaft 43, acting through an actuating arm 56 and a connecting arm 58 in the manner indicated in FIG. 1. Mounted in member 48, in axially parallel relationship to collet and spindle assembly 16, is an index locking pin 62. Near the outer end of index plate 52 are three spaced openings, x, y, and z, penetrating the plate in axially parallel relationship to the collet and spindle assembly. The openings x, y, and z are of equal size and shape and adapted to receive the locking pin 62 in snuggly sliding relationship. Disposed near the outer end of tool holder 54 are three mounted tools, x', y' and z'. The relative positions of index plate 52 and tool holder 54, and the configuration of cam 60, are such that with each forward movement of collet and spindle assembly 16 for purposes of machining work piece 38, locking pin 62 is guided into one of the openings in the index plate and work piece 38 to a corresponding tool on tool holder 54, after which the piece is held in the proper position against the tool while the latter effectuates its machining operation. For example, when the locking pin is routed into opening in the index plate, work piece 38 is guided to perfectly aligned contact with tool x' on tool holder 54, when the pin is routed into opening y'; etc. It will be apparent that by the use of the locking pin 62 in conjunction with index plate 52, as described, precise guidance of work piece 38 to any tool on tool holder 54, and maintenance of the proper positional relationship between the work piece and tool during machining of the former is readily achievable.

The sequence of machining operations on work piece 38 is determined by the configuration of cam 60. For example, the cam can be cut to permit counter-boring of the bores 64, 66, and 68 in the FIG. 3 article, if x', y' and z' represent boring tools sized to drill those openings, respectively, by actuating shaft 50 in a manner to guide locking pin 62 respectively into openings $x$, $y$ and $z$ of index plate 52, during successive reciprocating movements of collet and spindle assembly 16.

Firmly anchored in the collet control head 19, so as to extend rearwardly therefrom in parallel relationship to the axis of collet and spindle assembly 16 in the manner illustrated in FIGS. 1 and 2, are a pair of driver rods 70. Driver rods 70 are, as shown, spaced diametrically apart with respect to the collet and spindle assembly axis, and equally distant from, and parallel to, that axis. Driver rods 70 fit sliding within a pair of axially parallel openings in pulley 18, appropriately spaced for the purpose, in the manner illustrated in FIGS. 1 and 4 of the drawings. Pulley 18 is fastened to the frame of the screw machine by means of a separate mounting from that of the reciprocating portion of collet and spindle assembly 16. As a result of this mounting arrangement, the reciprocating portion of the collet and spindle assembly moves under the influence of timing and movement imparting cam 44, while pulley 18 remains stationary, during operation of the screw machine. Consequently, no side thrust from the pulley belt is imparted to the spindle of the collet and spindle assembly to cause cocking, and misalignment, of the latter during operation of the machine. The sliding relationship between driver rods 70 and their receptive openings in pulley 18 is such as to permit easy reciprocating movement of the axially movable part of the collet and spindle assembly while it remains in driving relationship with the axially stationary pulley. Friction can be reduced to a minimum between the driver rods and pulley 18 openings, to facilitate the sliding relationship therebetween, by the mounting of ball bushings in the openings, as illustrated in FIG. 4.

FIGS. 4 and 5 show the structural details of the collet and spindle assembly 16, including its collet control head 19 subassembly. The assembly comprises a collet 72 mounted on the end of a drawbar 73 and keyed to the spindle 17 to permit it to rotate with the spindle when the latter is driven by pulley 18. The spindle is mounted for rotation within a stationary housing 74, on a pair of ball bearings 76, positioned as shown. The housing 74 is provided with a front end cover 78 retaining a felt packing ring 80. There is a felt lubrication wick 82 disposed in the space between the housing 74 and spindle 17, shaped and positioned as illustrated in FIG. 4. Housing 74 extends generally between the ball bearings 76, terminating, at the rear, with the rearwardly disposed one of these bearings.

Just to the rar of the latter bearing is a cylindrical member 84, concentrically hollowed to fit slidably on spindle 17 and having a pair of diametrically opposite axial grooves 85, shaped to receive a pair of chucking levers 94 in a manner, and for a purpose, hereinafter described. Disposed in axially slidable relationship around member 84, hereinafter referred to as chucking lever guide 84, is the above-mentioned chucking spool 36. Just to the rear of chucking lever guide 84 is a round member 86, hereinafter, for reasons to be explained, referred to as chucking lever retainer 86, and to the rear of that, a round member 90, hereinafter referred to as driver rod retainer 90.

Chucking lever retainer 86 and driver rod retainer 90 are shaped to interfit around their facing peripheries to form a housing 102 in which rear portions of the chucking levers 94, a drawbar flange 96 and a spiral compression spring 98 are housed, as principal components, of the collet control head 19. Housing 102 is characterized by flat end walls, one of which is formed by chucking lever retainer 86, abuts against the rear end of chucking lever guide 84 and has a concentric opening sized to slidably engage the spindle 17. Spindle 17 terminates a short distance to the rear of where it passes through this opening, and is threaded to receive a spindle nut 88 with sufficient tightness to lock the chucking lever retainer 86 and chucking lever guide 84 together and hold them integrally rotatable with the spindle. Driver rod retainer 90 is fastened securely to chucking lever retainer 86 by means of Allen screws 92, one of which is shown in dashed lines, in FIG. 4. Driver rod retainer 90 is of generally cup-like shape, with a thin bottom and a relatively thick wall through which a pair of axial openings 104, sized to receive the driver rods 70, extend. The driver rods are firmly secured in the openings 104 in any suitable manner to permit them to function for the spindle driving purposes taught herein.

The drawbar flange 96 has a cylindrical segment characterized by the presence of a radially outwardly extending flange at one end. The cylindrical segment of the drawbar flange is fitted tightly around the drawbar so as to rotate coactively therewith, and has its radially outwardly extending portion facing forwardly, toward the front of the drawbar, and the rear end of its cylindrical segment slidably disposed in a receptive opening in the bottom of the driver rod retainer 90, all as illustrated in FIG. 4. The rear end of drawbar 73 is threaded to receive a drawbar nut 106, by means of which the drawbar flange can be positionally adjusted on the drawbar to vary the collet setting in its open position. Captive between the bottom of driver rod retainer 90 and the radially outwardly extending flange portion of drawbar flange 96, is a spiral compression spring 98.

Chucking levers 94 are elongate members of generally flat cross-section, having sharply angled foot segments 108 with rounded toe 110 and heel 112 configurations, and slightly bent end segments 114 disposed oppositely to their foot segments. All involved parts are sized, and the chucking lever retainer appropriately shaped, to permit installation of the chucking levers in collet control head 19 in the manner illustrated in the drawing, and particularly FIG. 4, with their foot segments held between toe swivel points on the rearwardly facing surface of chucking lever guide retainer 86, and heel bearing points on the drawbar flange, and their bent end segments 114 in contact with the edge of the opening in the forwardly facing side of chucking spool 36, again as illustrated in FIG. 4. Each of the chucking levers is held in the above-described position by the pressure of spiral compression spring 98 acting through the radially outwardly extending flange portion of drawbar flange 96 and causing the chucking levers to rock on their heels until their forwardly extending ends come into contact with the aforesaid edge of the opening in chucking spool 36. When the chucking levers are positioned as described, there is maximum distance between the radially outwardly extending flange portion of drawbar flange 96 and the bottom of driver rod retainer 90, as a result of the expanding force of the spiral compression spring, and collet 72 is in its open position, since the drawbar is pushed as far forwardly as possible relative to the spindle. As will be apparent, forward movement of the chucking spool 36 along chucking lever guide 84 squeezes the forwardly disposed ends of the chucking levers together and causes their heels to rock, in cam-like fashion, on drawbar flange 96 and urge the latter rearwardly, with respect to driver rod retainer 90, which is, of course, integral with spindle 17. This results in a pulling back of drawbar 73 within spindle 17, and consequent closing of collet 72. Thus, the collet is opened and closed, as required by the necessities of machine operation, by the mechanical action of chucking spool 36 on the chucking levers, the movements of the chucking spool being controlled by the action of trip dog holder cam 22 in the above-described manner.

Drawbar 73 has a hollow center in which is slidably disposed an ejector rod 100. The ejector rod 100 extends rearwardly from the spindle, through the center of the pulley 18 arbor, to a stationary anchor site on a bracket secured to the pulley support means. The length of the ejector rod is such as to permit it to push the finished work piece out of collet 72, and into a receiving chute for same, as collet and spindle assembly 16 reciprocates to a rearward position after the machining of the work piece has been completed.

I claim:

1. An improved automatic screw machine of the type suitable for the continuous production of shaped parts from bar stock, comprising, in combination: main spindle and headstock means for the intermittent advancement and recoil of the bar stock for processing purposes; auxiliary collet and spindle assembly means; means for reciprocally driving said collet and spindle assembly toward and away from the main spindle means in timed sequence to permit it to periodically grasp and move a piece severed from said bar stock axially away from and then back and forth in an axially reciprocating motion; tool means for working said work piece and means for infeeding and outfeeding the same relative to the path of movement of said collet and spindle assembly in accordance with a predetermined program to permit machining of the rear end of said work piece as the collet and spindle assembly urges it in the direction of the bar stock during its axial reciprocation; driven pulley means operatively associated with said auxiliary collet and spindle assembly and serving a collet opening and closing function to permit the assembly to grasp, retain and release the work piece, as necessary, during operation of the machine wherein the improvement comprises;

(a) an auxiliary collet and spindle assembly having, as principal parts, a collet, drawbar and spindle, and, as collet opening and closing means, a collet control head situated at the rear of said assembly;

(b) as the aforesaid pulley means, a pulley arbor and means for mounting same independently of said auxiliary collet and spindle assembly, in axial alignment with, and to the rear of the latter, and a pulley mounted on the arbor to rotate therearound; said collet control head having at least two elongate pulley drivers fixedly secured thereto, in positions of rearward extension therefrom and parallel relationship with each other and the axis of the collet and spindle assembly, and spaced radially outwardly from said axis; and (c) said pulley having a plurality of axial openings respective of said pulley drivers in freely slidable relationship, and properly positioned to receive the pulley drivers in such relationship, said pulley drivers being properly positioned and sufficiently strong and well-anchored at the rear of the collet and spindle assembly to permit driving of the assembly by said pulley, from belt power supplied thereto, while the assembly reciprocates during operation of the screw machine, without risk of spindle misalignment as a result of side thrust from the pulley belt on the collet and spindle assembly.

2. An improved automatic screw machine in accordance with claim 1 in which the collet, drawbar and spindle of said auxiliary collet and spindle assembly are fitted together with the collet keyed in axially slidable relationship within a receptive hollow in the front end of the spindle, in conventional fashion, and the drawbar extending rearwardly, and within, in axially slidable relationship with respect to the spindle, then extending outwardly, beyond the rear end of the spindle, for a relatively short distance;

said collet control head comprises a lever guide, a chucking spool, a chucking lever retainer, a pulley driver retainer, at least two chucking levers, a drawbar flange, slidably mounted on the drawbar, near the rear end of the latter, a spiral compression spring and means for preventing rearward movement of the drawbar lever flange along the drawbar beyond a certain point;

said lever guide, chucking lever retainer and pulley driver retainer being of cylindrical outer shape, adjacently positioned, locked together and fastenably secured to said spindle, near its rear end, so as to be rotatably coactive therewith the chucking lever retainer being sandwiched between the lever guide and pulley driver retainer, and the lever guide being of substantially smaller cross section than the chucking lever retainer;

said chucking spool being mounted concentrically around said lever guide in snug fitting, but axially slidable relationship, therewith, the rearwardly disposed face of said chucking spool and forwardly disposed face of said chucking lever being shaped and dimensioned to come flush when the spool is urged as far to the rear as possible along said lever guide;

said chucking lever retainer and pulley driver retainer being shaped to meet and form a housing with a hollow interior and a round rear opening through which said drawbar extends;

said drawbar lever flange having a cylindrical segment, sized to fit tightly around the drawbar, and a radially outwardly extending segment disposed at one end of said cylindrical segment, and being mounted on said drawbar with its radially outwardly extending segment facing toward the front end of the drawbar and its cylindrical segment extending through the aforesaid opening in said housing, in axially slidable relationship with the rim of the opening;

said spiral compression spring being mounted around the cylindrical segment of the drawbar lever flange to separate the radially outwardly extending segment of the flange and the rear wall of said housing, and urge the flange, and drawbar, to which it is attached, forwardly, relative to said spindle to which the chucking lever retainer and pulley driver retainer are fixedly secured;

said chucking levers being of equal size and shape, flat, elongate form, each bent sharply near one end, to form an angled foot segment with a rounded toe and heel, and bent slightly between the heel of its foot segment and its other end, in the same direction from its axis as the direction of bend of said foot segment therefrom;

said lever guide being provided with an axial groove in its outer surface for each of said chucking levers, sized to receive the lever in its full width, and said chucking lever retainer having a cooperating opening to admit the foot segment end of said lever into the interior hollow of said housing and permit extension of the remaining portion of the lever into said axial groove in the lever guide, said chucking lever retainer having a seat for the toe of the chucking lever formed in its rearwardly facing surface, both parts being sized and shaped to permit positioning of each of said chucking levers with its toe in said seat, its heel bearing against the forward facing side of the radially outwardly extending segment of the drawbar flange and the outer surface of the slightly bent portion of the chucking lever in radially outwardly bearing contact with the inner edge of the opening in the forward face of the chucking spool, and to permit pressure from the spiral compression spring to be transmitted through the radially outwardly extending segment of the drawbar lever flange to the heel of the foot segment of the chucking lever to hold the latter in position, and the relative positions of the collet, drawbar and spindle being such that the above-described positional relationship of the parts of the collet control head occur at the open position of the collet and forward movement of the chucking spool along the lever guide causes the chucking levers to swivel around their points of contact with the chucking lever retainer so that their heels move in cam-like fashion against the radially outwardly extending portion of the drawbar lever flange to urge the latter, and the drawbar on which it is mounted, rearwardly, relative to the spindle, and thereby pull the collet to its closed position in the forward end of said spindle; and said collet control head is fitted with means for using said chucking spool forwardly, relative to the lever guide, to actuate the collet to its closed position at properly timed intervals to permit the collet to perform its work piece grasping function in said screw machine, and to urge the chucking spool backwardly at the proper times to allow the chucking levers to yield to the pressure of the spiral compression spring, at properly timed intervals, to permit the spring to open the collet.

3. An improved automatic screw machine in accordance with claim 2 in which said chucking spool has a rim with an annular recess and defining radial flanges, and in which the means for imparting properly timed reciprocating movements to the axially movable part of the auxiliary collet and spindle assembly comprises a cam shaft provided with an appropriately cut timing and movement imparting cam and an actuating lever controller by the cam, operatively connected between said cam and said assembly, and said means for imparting appropriately timed forward and backward movements to the chucking spool for collet opening and closing purposes, comprises a chucking yoke and swivel support bracket therefore, said chucking yoke having a pair of downwardly depending legs, a pair of curved shoes adapted to fit against the sides of said chucking spool between the peripheral flanges thereof, said swiveling bracket being positioned to permit the downward depending legs of the yoke to hold said shoes against said spool between its peripheral flanges thereof, an appropriate timing and movement imparting cam affixed to said cam shaft, and a chucking yoke lever and chucking yoke connecting arm operatively connected between said cam and said chucking yoke whereby the cam serves to impart a back and forth movement to said chucking yoke lever which is transmitted, through the yoke connecting arm, operatively connected between said cam and said chucking yoke whereby the cam serves to impart a back and forth movement to said chucking yoke lever which is transmitted, through the yoke connecting arm, to the chucking yoke and shoes to cause properly timed movement of the chucking spool between its forward-most and rearward-most positions on the lever guide for collet opening and closing purposes.

4. An improved automatic screw machine in accordance with claim 1 in which with the means for imparting properly timed reciprocating movement to the axially movable part of the auxiliary collet and spindle assembly comprises a cam shaft provided with an appropriately cut timing and movement imparting cam and an actuating lever controlled by the cam, operatively connected between said cam and said assembly, and which includes indexing and tool holding means for assuring accuracy of tool positioning when said work piece is moved into contact with a working tool by the reciprocating movement of said collet and spindle assembly, comprising an index plate, a tool holder, a locking pin, an index plate and tool holder shaft, a timing cam mounted on said cam shaft and lever and connecting arm means operatively connecting said timing cam and said index plate and tool holder shaft;

the index plate having a plurality of openings at one end and being fixedly secured, at the other end, to said index plate and tool holder shaft to extend perpendicularly outwardly therefrom;

said tool holder having a number of tools equal to the number of openings in said index plate positioned at one end and being fixedly secured to said index plate and tool holder shaft at the other end so as to extend perpendicularly outwardly therefrom;

said locking pin being fixedly secured to said auxiliary collet and spindle assembly, in a position axially parallel thereto;

all parts being oriented so that forward reciprocating movement of the axially moveable part of said auxiliary collet and spindle assembly brings the locking pin into one of the openings in said index plate, each opening being sized to permit snugly sliding interfit of the pin therein, whereby the work piece is guided to a particular one of the tools held by said tool holder and held in properly aligned position with the tool while it is being machined thereby;

each of the openings in said index plate being positioned to guide the work piece held by the collet and spindle assembly to a separately corresponding tool on said tool holder, and said timing cam being designed to rotate the index plate and tool holder shaft as necessary to bring the proper index plate opening in line with the locking pin for each forward work piece machining pass of the axially movable part of the auxiliary collet and spindle assembly.

5. An improved screw machine in accordance with claim 3 which includes indexing and tool holding means for assuring accuracy of tool positioning when said work piece is moved into contact with a working tool by the reciprocating movement of said collet and spindle assembly, comprising an index plate, a tool holder, a locking pin, an index plate and tool holder shaft, a timing cam mounted on said cam shaft and lever and connecting arm means operatively connecting said timing cam and said index plate and tool holder shaft:

the index plate having a plurality of openings at one end and being fixedly secured, at the other end, to said index plate and tool holder shaft to extend perpendicularly outwardly therefrom;

said tool holder having a number of tools equal to the number of openings in said index plate positioned at one end and being fixedly secured to said index plate and tool holder shaft at the other end so as to extend perpendicularly outwardly therefrom;

said locking pin being fixedly secured to said auxiliary collet and spindle assembly, in a position axially parallel thereto;

all parts being oriented so that forward reciprocating movement of the axially moveable part of said auxiliary collet and spindle assembly brings the locking pin into one of the openings in said index plate, each opening being sized to permit snugly sliding interfit of the pin therein, whereby the work piece is guided to a particular one of the tools held by said tool holder and held in properly aligned position with the tool while it is being machined thereby;

each of the openings in said index plate being positioned to guide the work piece held by the collet and spindle assembly to a separately corresponding tool on said tool holder, and said timing cam being designed to rotate the index plate and tool holder shaft as necessary to bring the proper index plate opening in line with the locking pin for each forward work piece machining pass of the axially movable part of the auxiliary collet and spindle assembly.

6. An improved automatic screw machine in accordance with claim 1 in which said pulley drivers are two in number.

7. An improved automatic screw machine in accordance with claim 2 in which said chucking levers are two in number.

8. An improved automatic screw machine in accordance with claim 1 in which said axial openings in said pulley have ball bushing inserts.

9. An improved automatic screw machine in accordance with claim 3 in which said pulley drivers are two in number, said chucking levers are two in number, and said axial openings in said pulley have ball bushing inserts.

10. An improved automatic screw machine in accordance with claim 5 in which said pulley drivers are two in number, said chucking levers are two in number, and said axial openings in said pulley have ball bushing inserts.

References Cited
UNITED STATES PATENTS

| | | | |
|---|---|---|---|
| 1,806,562 | 5/1931 | Pichler | 29—37 |
| 1,946,429 | 2/1934 | Smith et al. | 82—2.7 |
| 2,343,914 | 3/1944 | Lloyd | 82—2.5 |
| 2,369,330 | 2/1945 | Wilson | 29—37 |
| 2,373,155 | 4/1945 | White | 82—2.5 |
| 2,376,476 | 5/1945 | Chatelain | 82—2.5 |
| 2,377,383 | 6/1945 | Slovak | 82—2.5 |
| 2,473,306 | 6/1949 | Schreiber | 82—2.5 |
| 2,775,026 | 12/1956 | Schrader | 29—406 |
| 2,917,313 | 12/1959 | Anderson | 279—1 |
| 3,340,755 | 9/1967 | Oman | 82—2.5 |

RICHARD J. HERBST, Primary Examiner

E. M. COMBS, Assistant Examiner

U.S. Cl. X.R.

10—89, 105; 29—27, 37; 82—2.5